United States Patent [19]

McLaughlin et al.

[11] Patent Number: 5,951,686
[45] Date of Patent: Sep. 14, 1999

[54] METHOD AND SYSTEM FOR REBOOT RECOVERY

[75] Inventors: Charles Andrew McLaughlin, Round Rock; Alongkorn Kitamorn, Austin; Chet Mehta, Austin; John Steven Langford, Austin, all of Tex.

[73] Assignee: International Business Machines Corporation, Armonk, N.Y.

[21] Appl. No.: 08/829,089

[22] Filed: Mar. 31, 1997

[51] Int. Cl.⁶ .................................................. G06F 9/445
[52] U.S. Cl. .................................................. 713/2
[58] Field of Search ..................... 395/651, 652, 395/181, 182.01, 182.02, 182.08, 182.21; 713/1, 2

[56] References Cited

U.S. PATENT DOCUMENTS

| | | | |
|---|---|---|---|
| 4,044,337 | 8/1977 | Hicks et al. | 364/200 |
| 4,095,268 | 6/1978 | Kobayashi et al. | 364/200 |
| 4,215,397 | 7/1980 | Hom | 364/101 |
| 4,360,917 | 11/1982 | Sindelar et al. | 371/49 |
| 4,511,982 | 4/1985 | Kurakake | 364/167 |
| 4,604,746 | 8/1986 | Blum | 371/25 |
| 4,965,717 | 10/1990 | Cutts, Jr. et al. | 364/200 |
| 5,142,165 | 8/1992 | Allard et al. . | |
| 5,193,181 | 3/1993 | Barlow et al. | 395/575 |
| 5,245,615 | 9/1993 | Treu | 371/16.5 |
| 5,249,187 | 9/1993 | Bruckert et al. | 371/68.1 |
| 5,251,227 | 10/1993 | Bruckert et al. | 371/12 |
| 5,267,246 | 11/1993 | Huang et al. | 371/165 |
| 5,291,600 | 3/1994 | Lutz et al. . | |
| 5,307,482 | 4/1994 | Bealkowski et al. | 395/575 |
| 5,313,625 | 5/1994 | Hess et al. | 395/575 |
| 5,313,628 | 5/1994 | Mendelsohn et al. | 395/575 |
| 5,317,752 | 5/1994 | Jewett et al. . | |
| 5,375,219 | 12/1994 | Okabe | 395/425 |
| 5,390,324 | 2/1995 | Burckhartt et al. . | |
| 5,410,706 | 4/1995 | Farrand et al. | 395/652 |
| 5,421,006 | 5/1995 | Jablon et al. . | |
| 5,437,047 | 7/1995 | Nakamura | 395/800 |
| 5,442,777 | 8/1995 | Nakajima et al. . | |
| 5,444,859 | 8/1995 | Baker et al. | 395/575 |
| 5,450,579 | 9/1995 | Johnson | 395/650 |
| 5,455,933 | 10/1995 | Schieve et al. | 395/183.03 |
| 5,467,449 | 11/1995 | Gauronski et al. . | |

(List continued on next page.)

FOREIGN PATENT DOCUMENTS

| | | | |
|---|---|---|---|
| 811929A2 | 12/1997 | European Pat. Off. | G06F 13/40 |
| WO9700480 | 1/1997 | WIPO | G06F 13/00 |

OTHER PUBLICATIONS

"Bus Fault Identification Algorithm", IBM Technical Disclosure Bulletin, vol. 32, No. 6A, Nov. 1989.
"Chapter 10: Error Detection and Handling", PCI System Architecture, 189–207.
"Programmed Clock Synchronization In A Skewed Clock Environment", IBM Technical Disclosure Bulletin, vol. 26, No. 8, Jan. 1984.
"Method to Initialize the Error Handling Logic of a Peripheral Component Interconnect System", IBM Technical Disclosure Bulletin, vol. 37, No. 08, Aug. 1994.
"Recovery from Single Critical Hardware Resource Unavailability", IBM Technical Disclosure Bulletin, vol. 36, No. 08, Aug. 1993.

*Primary Examiner*—Thomas M. Heckler
*Attorney, Agent, or Firm*—Sawyer & Associates; Volel Emile

[57] ABSTRACT

A computer system with reboot capability includes a processing mechanism, the processing mechanism supporting an operating system. The system further includes a service processor coupled to the processing mechanism, the service processor determining whether a reboot operation is needed. In addition, the computer system includes a memory mechanism coupled to the processing mechanism and the service processor, the memory mechanism storing a plurality of platform policy parameters and an automatic restart policy of the operating system to support the reboot operation of the service processor.

20 Claims, 3 Drawing Sheets

U.S. PATENT DOCUMENTS

| | | |
|---|---|---|
| 5,471,674 | 11/1995 | Stewart et al. . |
| 5,475,839 | 12/1995 | Watson et al. . |
| 5,487,148 | 1/1996 | Komori et al. .................... 395/182.02 |
| 5,488,688 | 1/1996 | Gonzales et al. .................... 395/183.1 |
| 5,499,346 | 3/1996 | Amini et al. ............................ 395/308 |
| 5,530,847 | 6/1996 | Schieve et al. .................... 395/183.14 |
| 5,530,946 | 6/1996 | Bouvier et al. .................... 395/182.21 |
| 5,557,547 | 9/1996 | Phaal ............................... 364/551.01 |
| 5,560,018 | 9/1996 | Macon, Jr. et al. .................... 395/733 |
| 5,560,033 | 9/1996 | Doherty et al. ......................... 395/800 |
| 5,564,054 | 10/1996 | Bramnick et al. . |
| 5,619,644 | 4/1997 | Crockett et al. .................... 395/183.21 |
| 5,680,537 | 10/1997 | Byers et al. ....................... 395/182.03 |
| 5,712,967 | 1/1998 | Grossman et al. ................. 395/182.01 |
| 5,742,851 | 4/1998 | Sekine ............................... 395/183.19 |
| 5,768,496 | 6/1998 | Lidgett et al. ..................... 395/183.01 |
| 5,768,612 | 6/1998 | Nelson ............................... 395/800.32 |
| 5,777,549 | 7/1998 | Arrowsmith et al. ................... 340/506 |
| 5,784,617 | 7/1998 | Greenstein et al. ...................... 395/674 |
| 5,790,870 | 8/1998 | Hausauer et al. ....................... 395/733 |
| 5,805,785 | 9/1998 | Dias et al. ......................... 395/182.02 |

METHOD AND SYSTEM FOR REBOOT RECOVERY

CROSS-REFERENCE TO RELATED APPLICATIONS

The present application is related to applications Ser. Nos. 08/829,017, entitled "Method and System for Check Stop Error Handling," filed Mar. 31, 1997; Ser. No. 08/829,088, entitled "A Method and System for Fault Isolation for PCI Bus Errors," filed Mar. 31, 1997; Ser. No. 08/829,018, entitled "Error Collection Coordination for Software-Readable and Non-Software Readable Fault Isolation Registers in a Computer System," filed Mar. 31, 1997; Ser. No. 08/829,016, entitled "Machine Check Handling for Fault Isolation in a Computer System," filed Mar. 31, 1997; and Ser. No. 08/829,090, entitled "A Method and System for Surveillance of Computer System Operations," filed Mar. 31, 1997.

FIELD OF THE INVENTION

The present invention relates generally to failure recovery in computer systems, and more particularly to reboot policies in computer systems.

BACKGROUND OF THE INVENTION

When a hardware fault is detected in a digital computer system, the failure condition is often so severe that the only way to recover from the failure state is to perform a complete system reset. A reset of the system usually occurs through a manual action (reboot, restart, etc.) to bring the system back to normal operation. Any failure impacts the availability of the computer system and the productivity of its users and business.

Some proprietary mainframe or mid-range computers which are used in mission critical computing utilize special hardware and software in conjunction with a separate processor to perform some level of system recovery from the failure. Unfortunately, providing special hardware and software adds significant cost to the development budget, cycle time, and product cost. Further, these cost problems hinder the use of special hardware and software in the lower end of the computer market segment, which utilizes primarily "off the shelf" and industry-standard components for system design.

In order to provide restoration of operations in lower end computer systems, some hardware computer vendors have added additional "intelligent" hardware which reboots or restarts the system upon detection of some computer system failures. Other vendors for operating systems have added restart capabilities in software by branching the instruction execution to a specific system firmware address for system failures. However, each of these approaches remains independent from one another, while only addressing a subset of the computer system failures.

Accordingly, what is needed is an improvement of computer system availability through a more integrated, comprehensive, and flexible approach for recovery from system failures that is cost effective and efficient.

SUMMARY OF THE INVENTION

The present invention provides a method and system for providing reboot recovery functionality in a computer system. In a method aspect, reboot recovery includes identifying an automatic reboot policy of an operating system. The method further includes providing a plurality of platform policy flags for a service processor (SP), and coordinating the automatic reboot policy with the plurality of platform policy flags to control reboot operations by the SP.

In a further method aspect, a method for utilizing a service processor within a computer system to perform reboot operations includes establishing a plurality of platform policy parameters, and identifying a condition requiring a reboot. The method further includes attempting the reboot with the service processor based on values for the plurality of platform policy parameters and an operating system automatic restart policy.

A computer system with reboot capability includes a processing mechanism, the processing mechanism supporting an operating system. The system further includes a service processor coupled to the processing mechanism, the service processor determining whether a reboot operation is needed. In addition, the computer system includes a memory mechanism coupled to the processing mechanism and the service processor, the memory mechanism storing a plurality of platform policy parameters and an automatic restart policy of the operating system to support the reboot operation of the service processor.

The present invention successfully provides a more cost effective solution to improve system availability of unattended systems. Further, a coordinated policy between the operating system and hardware platform is achieved. In addition, greater flexibility is provided with the modifiable policy flags and a comprehensive set of policy settings for enabling reboot recovery. These and other advantages of the aspects of the present invention will be more fully understood in conjunction with the following detailed description and accompanying drawings.

DESCRIPTION OF THE INVENTION

The present invention relates to reboot operations in a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
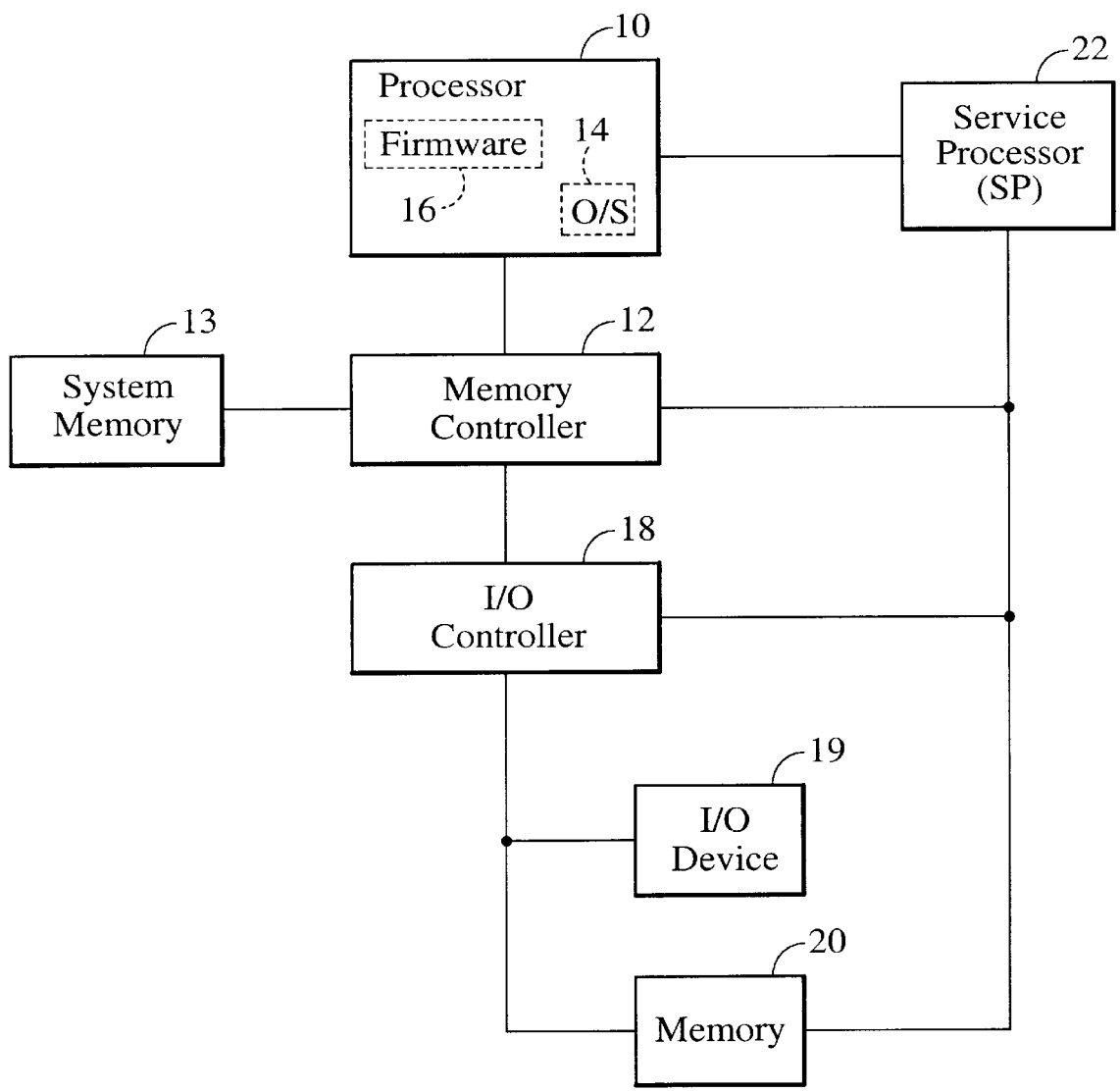
FIG. 1 illustrates a block diagram of a computer system in accordance with the present invention.

FIG. 1 illustrates a basic block diagram of a general purpose computer system for use with the present invention. As shown, the computer system includes a processor 10, such as a PowerPC™ processor from IBM Corporation, Inc., coupled to memory controller 12, which controls system memory 13, i.e., RAM (random access memory) and ROM (read only memory). An operating system (O/S) 14 typically runs on the processor to perform basic tasks in the computer system and act as a platform for application programs. Also included is firmware 16 that runs on the processor 10 and is code stored in suitable memory, such as non-volatile RAM, or EPROM (erasably programmable read only memory), as is well understood to those skilled in the art.

Further, an input/output (I/O) controller 18 is coupled to the processor 10 for controlling the interactions between the processor 10 and sub-ordinate components, i.e., sub-components, such as input/output devices 19, e.g., a hard disk drive, a monitor, etc., that adhere to an input/output standard, such as a PCI standard, and a memory device 20, such as non-volatile RAM (NVRAM). Further included is an embedded controller, i.e., a service processor (SP) 22. In accordance with the present invention, the SP 22 suitably controls reboot operations that function in correspondence with user-defined platform reboot policies. For purposes of this discussion, the term 'platform' suitably refers to the hardware and firmware portion of the computer system.

Figure 2:
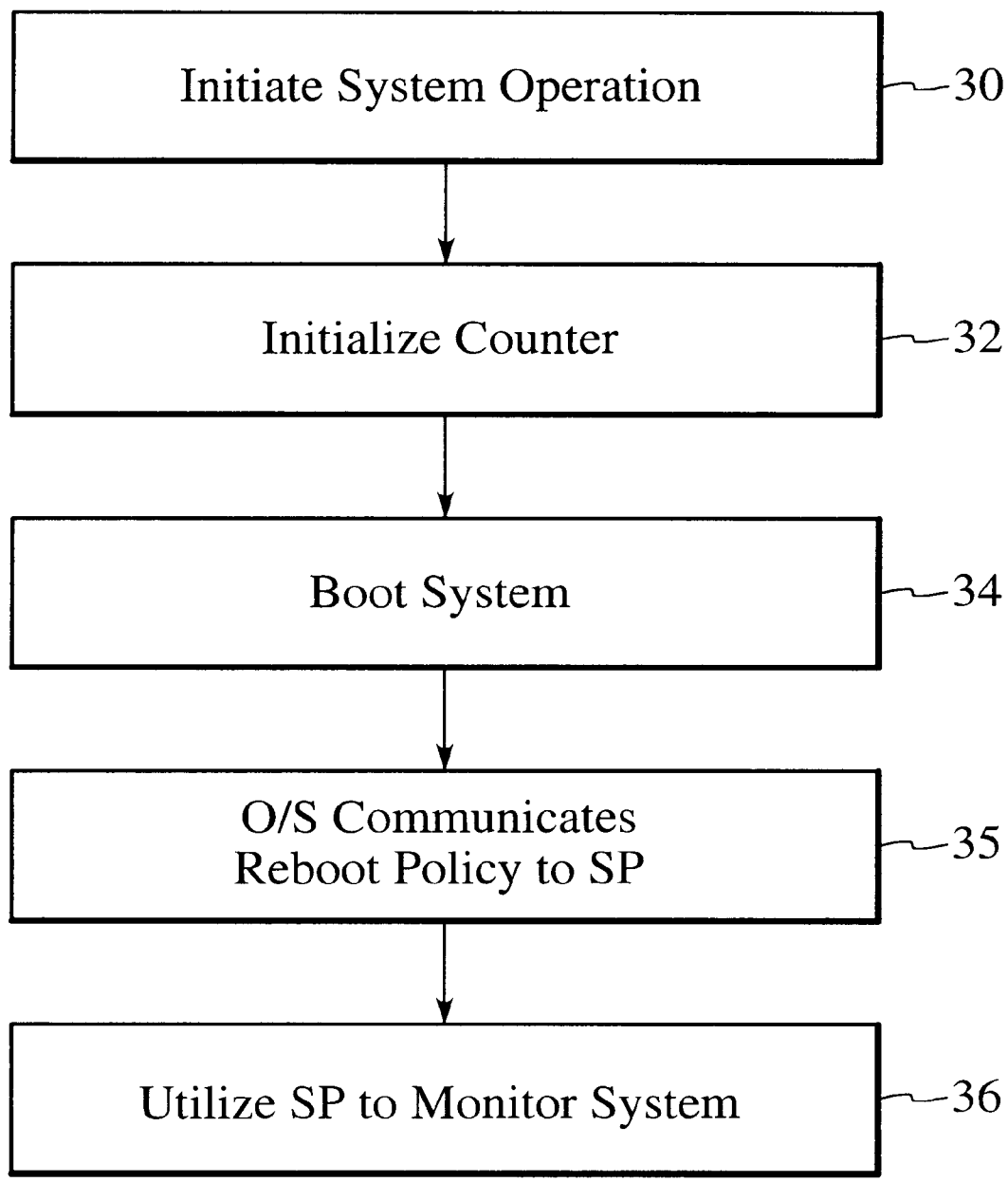
FIG. 2 illustrates a flow diagram for reboot and recovery in accordance with the present invention.

FIG. 2 illustrates a flow diagram of a method for utilizing the SP 22 in performing reboot operations in accordance with the present invention. The process begins with an initiation of system operation (step 30) after a power-on occurrence. The process continues with an initialization of a reboot counter mechanism (step 32), e.g., a reset of a counter mechanism to a zero value, as is well appreciated to those skilled in the art. A boot operation for the system then suitably occurs (step 34). Then the O/S 14 communicates a reboot policy at the SP 22, via step 35. The SP 22 is then utilized to monitor the system operation for a possible reboot (step 36), as described in more detail with reference to FIG. 3.

Figure 3:
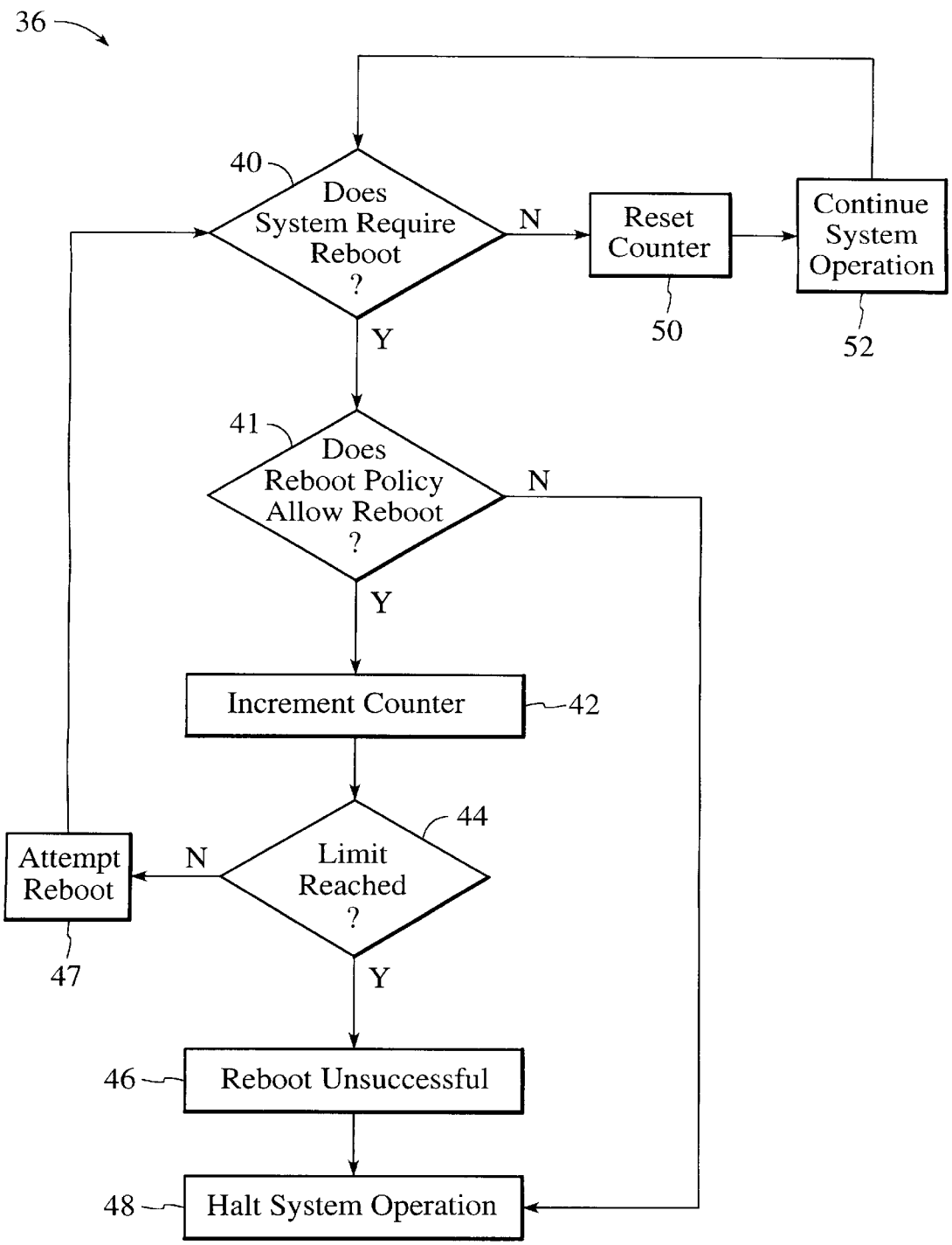
FIG. 3 illustrates a flow diagram detailing a process of utilizing a service processor to monitor system operations for possible reboot of FIG. 2.

Referring now to FIG. 3, during the boot process, preferably the SP 22 determines whether a reboot is necessary (step 40) by considering several factors. For example, in determining whether a reboot is necessary, the SP 22 monitors the progress of the boot operation through periodic signals, i.e., 'heartbeats', from firmware 16. Similarly, the SP 22 monitors for an occurrence of a surveillance heartbeat from the O/S 14 through a resident function in the firmware 16, e.g., an event-scan function. The SP 22 may also determine a reboot is necessary when there is hardware failure, e.g., a check stop error, or an A/C power loss. Next it must be determined if the reboot policy allows for reboot, via step 41. Accordingly, if one of the monitored conditions occurs, and the reboot policy allows for reboot, the SP 22 determines if a reboot is necessary, and the reboot counter mechanism is incremented (step 42).

A determination of whether a predefined count limit for the reboot counter mechanism has been reached (step 44) then occurs. Suitably, the predefined count limit is provided as a parameter policy flag in a configuration partition of the memory device 20 and defines a platform boot retry limit, e.g., sp-bootrt-limit, that indicates the number of consecutive times, e.g., three, that the boot process will be retried until successful. When the limit has been reached, the attempt to reboot is unsuccessful and an indication that the system can't reboot or that reboot is disabled is suitably provided (step 46). The system operation is then appropriately placed in a standby condition and halted (step 48) until a manual reboot occurs to return the process to step 30 or a power off occurs to shut off the system completely.

If, on the other hand, the reboot policy does not allow reboot (step 41) the system operation is halted directly, via step 48.

When the predefined count limit, indicated by the sp-bootrt-limit, has not been reached, the process preferably continues with a reboot attempt (step 46). Suitably, additional, modifiable parameter policy flags are defined to control the behavior of the system reboot by the SP 22 and are appropriately stored in the configuration partition of the memory device 20. Of course, depending on the platform design, the scope of each flag can be extended or additional flags can be added to enhance flexibility and allow changes to the default system policy settings as desired.

Preferably, one of the parameter policy flags indicates a platform follow O/S reboot policy, e.g., 'sp-os-plt-reboot'. The sp-os-plt-reboot parameter suitably indicates whether a reboot will follow an automatic restart policy of the O/S 14 if the policy exists and is known. A default value of '1' suitably indicates that the platform will follow the automatic restart policy, while a value of '0' suitably indicates the platform will not follow the automatic restart policy.

The automatic restart policy is preferably provided by the O/S 14 through on an architected interface to memory device 20. Suitably, the automatic restart policy resides in a system partition of the memory device 20 and is created by the firmware 16 during system initialization. By way of example, the existence of an automatic restart policy is appropriately indicated by an operating system reboot variable, e.g., 'os-auto-restart'. The variable, with a value of '1', suitably indicates that the computer system will attempt to reboot in the case of a system crash; with a value of '0' indicates that the computer system will not attempt to reboot in the case of a system crash; and with a value of 'x' or 'not present' indicates that the O/S 14 has not yet communicated its automatic restart policy to the platform, which is an appropriate default value for the variable with an expected modification by the O/S 14. With the architected interface to the partition, the O/S 14 may modify the automatic restart policy and have that modification available to the SP 22 to achieve a coordinated system reboot/restart policy.

To provide greater flexibility for system reboot, another parameter policy flag acts as a platform reboot policy parameter, e.g., 'sp-plt-reboot'. The sp-plt-reboot parameter preferably is enabled, e.g., set to a '1' value, depending on the condition of the sp-os-plt-reboot parameter and indicates reboot will occur for a set of pre-defined system failure conditions, e.g., boot, checkstop and operating system hangs. By way of example, the sp-plt-reboot parameter is suitably enabled, e.g., has a '1' value, when the sp-os-plt-reboot parameter has a value of '0' to maintain a reboot operation with the SP 22 when the preference is not to follow an O/S reboot policy. Conversely, when the sp-os-plt-reboot parameter has a value of '1', the sp-plt-reboot parameter is enabled as long as the O/S auto restart variable is 'x'. In the latter situation, reboot operations via the SP 22 are suitably maintained, even though the automatic reboot policy of the O/S is preferred but not yet known, as might occur when a time-out happens before the O/S has had a chance to fully communicate its reboot policy. A disabled condition, e.g., a '0' value, for the sp-plt-reboot parameter suitably acts as a default condition and indicates reboot will not occur for a set of pre-defined system failure conditions.

Another preferable platform policy flag is an AC loss reboot policy parameter, e.g., 'sp-ac-reboot', that supplies an indication of whether the system is returned to a same power state that existed prior to AC loss. For example, in an enabled state, e.g., a '1' value, if AC power is lost, the parameter indicates that the SP 22 should return the system to the same power state existing before the AC power loss, e.g., if the state was an 'on' state, the system will reboot when power is restored. In a disabled state, e.g., a '0' value, the power suitably remains off even when AC power is restored regardless of the initial state.

Once the attempt to reboot is performed, the process returns to step 40 to determine if the reboot was successful.

When the reboot is successful, the reboot counter mechanism is suitably reset (step 50). Normal operating conditions then proceed (step 52), and the SP 22 monitoring continues for a possible reboot condition, i.e., the process returns to step 40.

The present invention effectively utilizes an existing embedded controller/SP in the system with additional software functions to monitor for multiple types of system failures, including boot, checkstop, operating hangs, A/C power loss. Upon detection of these failures, with appropriate user-defined policy settings, successful rebooting of the system occurs to restore normal operation without requiring the addition of sophisticated hardware and/or software. Thus, the present invention provides coordinated and flexible system reboot operations that remain cost-effective for low-end computer systems.

Although the present invention has been described in accordance with the embodiments shown, one of ordinary skill in the art will readily recognize that there could be variations to the embodiments and those variations would be within the spirit and scope of the present invention. For example, although the present invention has been described in terms of a uniprocessor system, the aspects are also applicable to multiprocessor environments. Accordingly, many modifications may be made by one of ordinary skill in the art without departing from the spirit and scope of the appended claims.

What is claimed is:

1. A method for providing reboot recovery functionality in a computer system, the method comprising:
    establishing an automatic reboot policy of an operating system;
    providing a plurality of platform policy flags for a service processor (SP); and
    controlling the reboot operations by the SP based on the automatic reboot policy with the plurality of platform policy flags.

2. The method of claim 1 wherein providing a plurality of platform policy flags further comprises providing a flag indicating whether a platform follows an operating system reboot policy.

3. The method of claim 2 wherein providing a plurality of platform policy flags further comprises providing a platform reboot policy flag.

4. The method of claim 3 further comprising enabling the platform reboot policy flag based on a status of the flag indicating whether a platform follows an operating system reboot policy.

5. The method of claim 4 wherein when the flag indicates that the platform does not follow an operating system reboot policy, the platform reboot policy flag is enabled.

6. The method of claim 4 wherein when the flag indicates that the platform does follow an operating system reboot policy, the platform reboot policy flag is enabled based on a status of the automatic reboot policy.

7. The method of claim 6 wherein a not present status of the automatic reboot policy enables the platform reboot policy flag.

8. The method of claim 1 wherein providing a plurality of platform policy flags further comprises providing a platform reboot limit flag as an indicator of a number of consecutive times a reboot is attempted by the SP.

9. The method of claim 1 wherein providing a plurality of platform policy flags further comprises providing an A/C loss reboot policy flag to indicate whether the system returns to an initial power state after power loss.

10. A method for utilizing a service processor within a computer system to perform reboot operations, the method comprising:
    establishing a plurality of platform policy parameters;
    monitoring for a condition requiring a reboot; and
    attempting the reboot with the service processor based on values for the plurality of platform policy parameters and an operating system automatic restart policy.

11. The method of claim 10 further comprising establishing a platform boot retry limit and limiting the attempting to reboot to a value of the platform boot retry limit.

12. The method of claim 10 further comprising establishing a parameter for a follow operating system reboot policy, wherein when the parameter for the follow operating system reboot policy is enabled, the attempt to reboot follows the operating system automatic restart policy.

13. The method of claim 12 further comprising establishing a platform reboot policy, and enabling the platform reboot policy when the parameter for the follow operating system reboot policy is disabled.

14. The method of claim 10 further comprising establishing a platform A/C power loss policy, and enabling the platform A/C power loss policy to return the computer system upon reboot to a power state existing prior to an A/C power loss.

15. A computer system with reboot capability, the computer system comprising:
    a processing means, the processing means supporting an operating system;
    a service processor coupled to the processing means, the service processor determining whether a reboot operation is needed; and
    memory means coupled to the processing means and the service processor, the memory means storing a plurality of platform policy parameters and an automatic restart policy of the operating system to support the reboot operation of the service processor.

16. The computer system of claim 15 wherein the memory means stores the plurality of platform policy parameters in a configuration partition and the automatic restart policy in a system partition.

17. The computer system of 15 wherein the memory means, stores a platform policy parameter indicating whether an operating system restart policy is followed as one of the plurality of platform policy parameters.

18. The computer system of 17 wherein the service processor performs the reboot operation in accordance with the automatic restart policy of the operating system when the platform policy parameter indicates that an operating system restart policy is followed.

19. The computer system of 18 wherein the memory means further stores a platform reboot policy parameter as one of the plurality of platform policy parameters.

20. The computer system of 19 wherein the platform reboot policy parameter enables reboot when the platform policy parameter indicates that an operating system restart policy is not followed.

* * * * *